April 4, 1961 J. F. STEINKE ET AL 2,977,779
TORQUE LIMITER
Filed Jan. 29, 1959 2 Sheets-Sheet 1
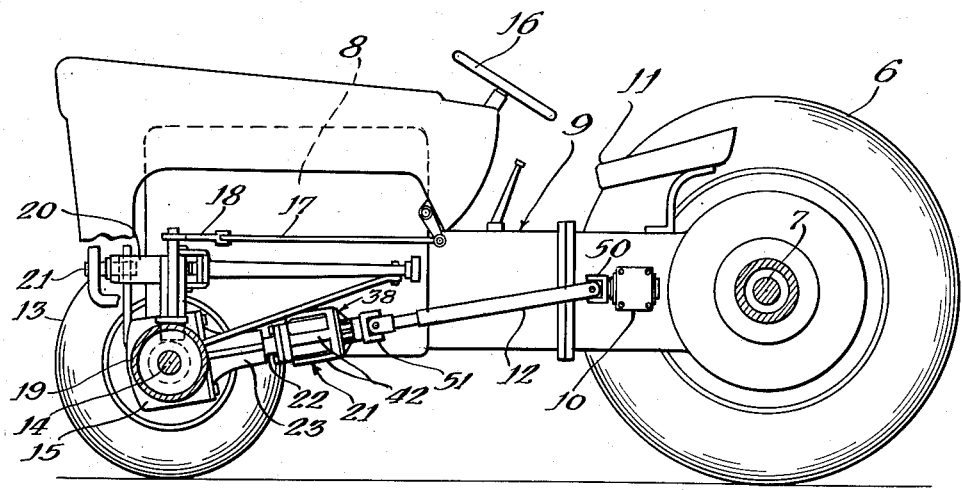
Inventors:
Joseph F. Steinke
Lloyd C. Erickson
By: Hofgren, Brady, Wegner,
Allen & Stellman
Attorneys.

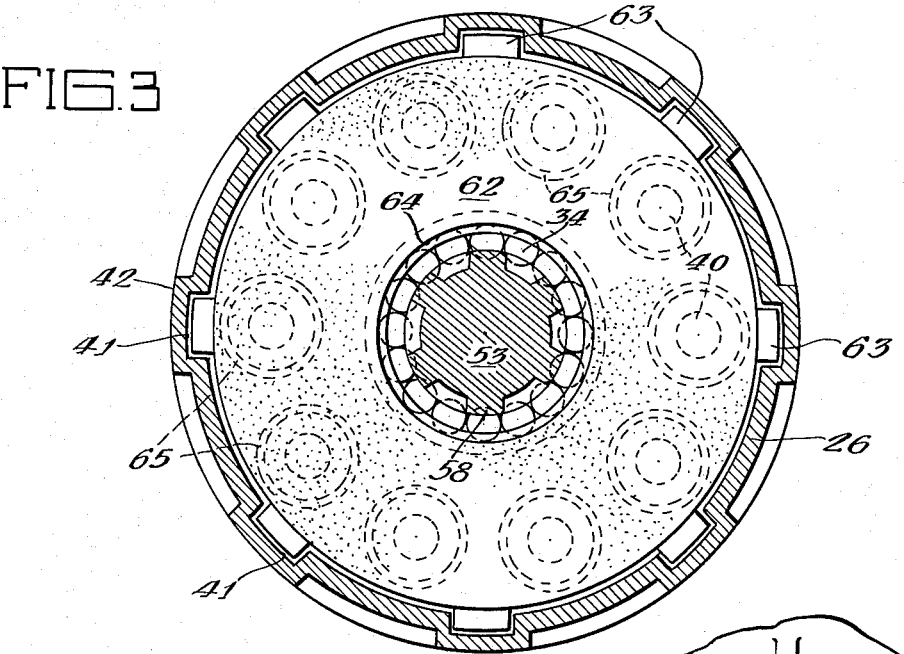
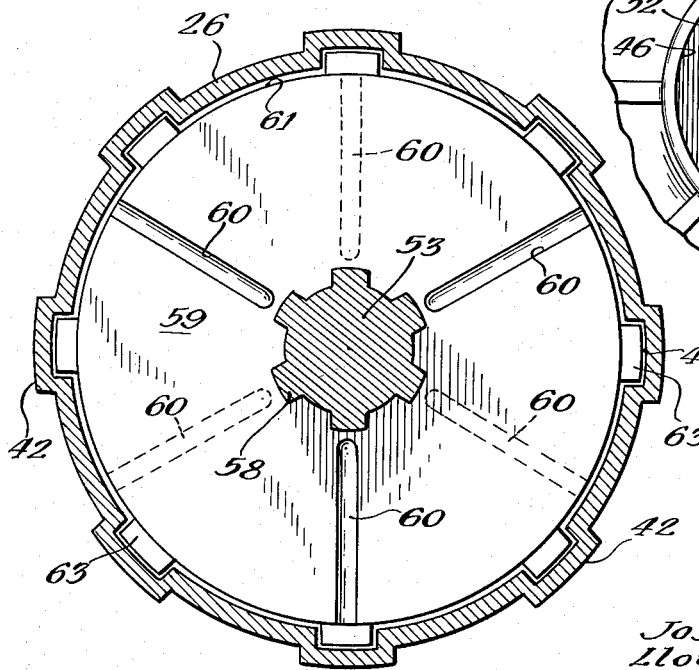
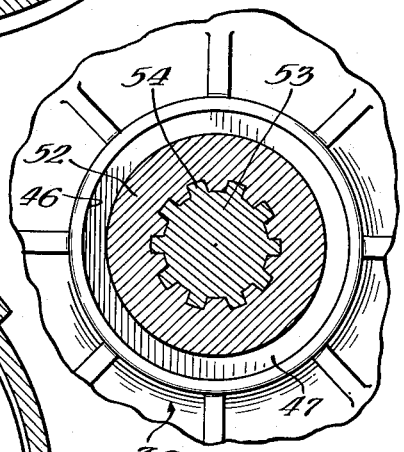

United States Patent Office 2,977,779
Patented Apr. 4, 1961

2,977,779
TORQUE LIMITER

Joseph F. Steinke and Lloyd C. Erickson, Elwood, Ill., assignors to Elenco Products Corporation, a corporation of Illinois Filed Jan. 29, 1959, Ser. No. 789,822

3 Claims. (Cl. 64—30)

This invention relates to a torque transmitting device and more particularly to a device for placement in the drive of a tractor enabling the transmission of torque up to a predetermined maximum amount and the avoidance of transmitting torque of greater amounts.

In some four-wheel drive tractors, the drive train to the front and rear wheels is taken from the same drive shaft without the interposition of any mechanism to permit slipping of one set of wheels relative to the other. The use of attachments on some tractors inherently causes a greater load to be placed on one axle rather than distributing the load over the four wheels of the tractor. Under such circumstances, the traction of the wheels more heavily loaded is greater than the wheels on the axle bearing less of the load with the result that the torque which may be delivered to the heavier loaded wheels may result in breakage of some parts of the drive train. The use of tractors with attachments inherently causes much variation in the loading of the wheels and thus much variation in the traction of the various wheels on the ground. The present invention provides a torque limiting unit in the drive to one set of wheels placing a limit on the amount of torque that can be delivered to those wheels. The limiting amount of torque transmission may be so chosen as to protect components of the drive system from breakage under operating conditions.

The application of torque to wheels of a tractor may be made gradually without breaking parts of a drive system whereas the sudden application of high torque values might result in failure. In the present invention, a torque transmitting device is provided which will slip and prevent application of torque over a predetermined amount at a given engine speed. It would be desirable to effect a gradual increase in the maximum torque transmitted to loaded wheels by an increase in the speed of the tractor engine. It is one of the objects of this invention to provide a torque transmitting device capable of such operation.

Torque limiting devices relying upon the slip of frictionally engaging parts often deliver a wide variation of torque, depending upon the temperature at which the device is operating.

It is another object of this invention to provide a torque transmitting device which will have very little variation in the maximum torque transmitted due to changes in temperature.

Another object of this invention is to provide such a torque transmitting device which does not vary the maximum amount of torque delivered after a prolonged period of setting idle.

Another object is to provide such a torque transmitting device which is sealed against the influence of moisture from any outside source.

A further object is to provide a unit which may be pre-set to deliver predetermined maximum amounts of torque and which is virtually tamper proof.

Other objects, features and advantages of the invention will become apparent from the following description of a preferred embodiment illustrated in the accompanying drawings, in which:

Figure 1 is a side elevational view of a tractor equipped with the present invention, partly cut away and partly in section for clarity of illustration;

Figure 2 is a longitudinal central sectional view through a device embodying this invention on an enlarged scale compared to the scale of Figure 1;

Figure 3 is a transverse sectional view through the unit taken substantially along line 3—3 in Figure 2;

Figure 4 is a transverse sectional view through the unit taken substantially along line 4—4 in Figure 2, and Figure 5 is a transverse sectional view external of the unit but through a portion thereof taken substantially along line 5—5 in Figure 2.

The present invention is illustrated in the drawings as installed in operative position on a utility size tractor equipped with a front driving axle instead of the usual idler front wheels. In Figure 1 of the drawings the tractor has the usual large rear wheels 6 with an axle 7 driven by an engine 8 in appropriate drive train housed within the frame 9 of the tractor. A gear box 10 on the side of the frame adjacent the seat 11 takes power from the main drive train of the tractor to the rear wheels 6 and by means of an external drive shaft 12 delivers torque to the front wheels 13 of the tractor. The front wheels receive their driving force through axles 14 connected into a differential within the housing 15 driven by means of the shaft 12. The front wheels 13 are steerable by means of the steering wheel 16 connected through steering rods 17 to steering arms 18 on the front wheels. The axle housing 19 is supported on a crossbar 20 pivoted on a pin 21 at the front of the tractor. The structure of the front wheel drive may be substantially as that illustrated in the Steinke and Erickson Patent No. 2,855,063.

Many attachments for use with utility tractors provide for the application of heavy load on the front wheels of the tractor. Front end loading buckets for the handling of earth or building materials generally apply a great amount of load on the front wheels. Under such circumstances, the rear wheels 6 of the tractor may well be relieved of a part of their load and may spin when the engine is coupled in a normal driving relation with all four wheels. The additional traction on the front wheels 13 may allow the application of an excessive amount of torque to the axles 14. Operators of the tractors are often inclined to apply, suddenly, the full torque available from the tractor engine to the wheels and in some such instances, axle breakage has occurred.

In the present invention, the drive to the front wheels of the tractor is equipped with a torque transmitting device 21 which might appropriately be referred to as a torque limiter. All torque delivered by the drive shaft 12 on the rearward side of the torque transmitting device 21 is transferred through the device to the drive shaft portion 22, passing through the housing 23 to the axles 14 for driving the front wheels. The construction of the device 21 is such as to limit the maximum torque which can be applied to the front wheels. At the same time, the device is so constructed that the maximum torque which can be applied to the front wheels is variable directly with the speed at which the drive shaft 12 is rotating. This permits an increased torque output through the transmitting device 21 by advancing the throttle and increasing the speed of the engine 8 of the tractor.

The structure of the torque limiter is best illustrated in Figures 2–5. The entire unit forms a part of the drive shaft to the front wheels and turns in unison with the drive shaft during normal operations. The housing 25 has a generally circular cylindrical sidewall 26 formed integrally with the bottom wall 27 having an outwardly extending circular boss 28 to which a mating plate 29 on the drive shaft portion 22 may be attached by machine screws 30. The housing is open only at its upper end and is sand cast of nodular iron requiring very little machining in order to be in condition for use. An upstanding circular wall 31 in the bottom of the casting is machined on its inner surface 32 in order to receive one race 33 of a bearing 34. The end surface 35 of the outstanding circular boss 28 is also machined in order to be flat for contact with the plate 29 on the drive shaft portion. The upper end of the housing is cut to provide threads 36 in order to receive the cover member 38. The only other machining that needs to be done on the housing is the grinding of the surfaces 39 about a plurality of upstanding bosses 40 extending toward the open end of the housing from the bottom wall 27.

The form of the wall 26 of the housing is best seen in the cross sectional views of Figures 3 and 4 wherein it will be noted that the wall is cast with longitudinally extending grooves 41 here shown as eight in number. The outer configuration of the housing appears to have ribs 42 due to the cast form in making the longitudinal inner grooves. The cast grooves are for the purpose of receiving friction driving plate lugs, or ears, held against rotation relative to the housing.

The cap or closure member 38 for the housing is also a cast member provided with mating threads for the threads 36. The cap requires very little machining, only sufficient on the surface 43 to receive the outer race 44 of bearing 45 and on the surface 46 in order to provide a seal support for the seal 47. The inner surfaces 48 and 49, both circular in plan, are ground so as to rest in a single plane.

Torque is transmitted through the torque limiter 21 by a frictional contact between driving and driven plates with the housing 26. The drive shaft 12 has a universal joint 50 at its rear end and a similar universal 51 connecting the shaft into the torque limiter. In Figure 2 one clevis 52 of the joint 51 is shown as connected to a stub shaft 53 extending out of the torque transmitting device. The connection is made as illustrated in Figure 5, the outer end of shaft 53 having splines 54 matching with the splines formed on the clevis member 52. A nut 55 on the outer threaded portion 56 of the shaft holds the clevis and shaft together. An O-ring seal, reposing in a machined groove cutting through the spline, prevents moisture from travelling down the shaft to the interior of the device 21. The seal 47 about the outer part of the clevis 52 serves a similar moisture proofing function.

The stub shaft 53 is supported within the torque limiter by the bearings 44 and 45, the former being supported in the bottom of the housing and the latter being supported in the cover 38. The bearing 45 has an inner race fitting about the splines 54 on the stub shaft. The shaft is arranged coaxially with the housing. As illustrated in Figure 4, the portion of the shaft within the housing is provided with a relatively heavy splined section 58 on which are drivingly mated a plurality of cast iron disks or plates 59. Herein, six cast iron plates are shown, each being in driving contact with the stub shaft but movable longitudinally of the shaft since the splines do not grip the plates tightly. Each plate is provided on each side with three cast-in-place radial grooves 60 extending from near the inner portion to the edge of the plate. The grooves are approximately 120° apart and are offset on one side, 60° from the grooves on the opposite side of the plate. Any driving force delivered to the stub shaft causes the cast iron plates to rotate with the shaft. The outer periphery 61 of the cast iron plates is of a size to be out of contact with the outer wall 26 of the housing.

The driven plates of the torque transmitting device are secured to the housing and not to the stub shaft, as more clearly shown in Figure 3. Each driven plate 62 has a plurality of ears 63, one for reception within each of the longitudinal grooves in the housing. The inner periphery 64 of each plate is considerably larger than the splines on the shaft 53 so as to have no contact with the shaft. The plates 62 are likewise movable longitudinally of the housing due to the looseness of fit between the ears 63 and the grooves 47 in the housing.

The plates for transmitting torque are frictionally urged into engagement by a plurality of coiled springs 65, here shown as ten in number, symmetrically arranged in the bottom of the housing. Each spring extends around one of the upstanding bosses 40 and bears against the machined surface 39 around the boss. The springs are chosen to provide a desired loading on the surfaces of the superposed plates. In the present instance, a loading of about 150 pounds per square inch is provided by the ten springs 65. Six cast iron plates are in contact with the driven plates 62 and with the materials used and the loading described, the unit will deliver about 600 foot-pounds of torque.

An important feature of the torque limiter 21 is that the maximum torque delivered through the unit may be varied under the control of the user. The driven plates 62 are each provided with a facing of sintered bronze bonded to a steel base. It has been found that the use of the sintered bronze in contact with the cast iron plates 59 will permit an increase torque output in the event that the revolutions of the drive shaft 12 can be increased. The 600 foot-pounds torque setting of the device is not an absolute maximum, as it has been found that whereas the plates will slip initially at the set torque level, increasing the r.p.m. of the drive shaft 12 will result in an output of increased torque through the torque transmitter 21. Some units have resulted in maximum torque outputs up to 25% over the 600 foot-pounds value. This increase has resulted when the unit is relatively cold and after extended use raising the temperature materially. It is believed that the increase input speed results in an increase in the frictional resistance between the plates, resulting in increased torque output. Ordinarily, the increase in engine speed to obtain an increase r.p.m. of the drive shaft occurs gradually even with a sudden increase in the throttle setting of the tractor engine. Such gradual increase in r.p.m. does not apply sudden stresses to the front axle 14 and thus does not result in breakage.

The use of cast iron and sintered bronze faced plates also results in a more uniform maximum torque transmission over a wide range of temperatures. When the unit is first started, its temperature may be almost ambient. After considerable use at or near the peak load limits, and after considerable slipping of the plates against each other, the temperature may rise to several hundred degrees Fahrenheit. Throughout the range of temperature variation, the maximum torque output is not particularly noticeably different and tests have shown that the variation in torque output is very small, generally less than 10%. This lack of variation and torque output has also allowed relatively long periods of setting idle without varying the torque output of the unit upon starting. The cast-in grooves in the cast iron plates allows any particles of material worn from the plate surfaces to find their way to the bottom of the unit through the longitudinal grooves in the housing outer wall. The plates thus retain the same dry frictional physical characteristics throughout extended use. It is preferable to assemble the units and seal them against any tampering with the setting originally made. Each unit may be tested when built and in the event the springs 65 do not provide the desired loading, shims may be interposed between the cover member and the uppermost plate 62. The ground surfaces 48 and 49 provide good bearing between the cover and upper plate and the shim stock used should ordinarily be of the same size as the plate 62. The threads connecting the cover and housing are generally pinned against relative movement, requiring the drilling out of the pin in order to disassemble or tamper with the setting of the unit. The location and knowledge of the presence of the pin are generally both lacking to the user so that the unit is virtually tamper proof.

During normal operation at loadings of the tractor requiring less than the maximum torque, there will be no slipping between the cast iron and sintered bronze faced plates. The entire unit rotates in unison with the parts of the drive shafts 12 and 22 connected to the unit. The only time that slipping occurs between the plates is when the maximum torque is reached or exceeded. The setting of the unit is such that breakage of drive components is prevented yet allows a gradual increased torque delivery desirable for obtaining the maximum work output of the tractor.

The foregoing detailed description has been given for clearness of understanding only, and no unnecessary limitations are to be understood therefrom, for some modifications will be obvious to those skilled in the art.

We claim:

1. A torque transmitter for placement in a drive train to limit the maximum torque delivered by a drive shaft to a predetermined range, comprising: a one-piece housing having a longitudinal axis, a cover on the housing, said cover and housing cooperatively carrying a stub shaft coaxial with the housing, said housing and stub shaft having means for connection into said drive train substantially coaxial with said drive shaft; a plurality of friction drive plates within the housing transverse said axis for drivingly connecting said housing and stub shaft, alternate plates being drivingly connected directly and respectively to said housing and to said stub shaft; and spring means within the housing urging said plates toward the cover and together in stacked relation with a predetermined substantially constant loading, said housing being closed and having a fixed predetermined space therein occupied by said plates and spring means, said plates being of dissimilar metals with the plates connected to said stub shaft being of the same metal and the plates connected to said housing being of the same metal so as to transmit torque in amounts up to a predetermined maximum range between said plates variable directly with speed of the input drive train.

2. A torque transmitting device for connecting spaced ends of the drive shaft of a tractor, comprising: a housing closed at one end and mounting a cover member closing the opposite end to provide the housing with a fixed longitudinal space therein, said housing having means for securing the same to one end of said drive shaft for turning therewith; a stub shaft idly mounted in spaced bearings respectively in said housing and cover member and having an outer splined end for attachment to the other end of said drive shaft so that all torque delivered by said drive shaft must be transmitted through said device; a clevis member having a base mounted upon said splined end of the stub shaft and a resilient sealing ring reposing in a groove extending through said splines between said clevis member and stub shaft to seal against moisture entering the housing along said shaft; said cover having a portion extending about the base of said clevis member with sealing means engaging said base to seal the interior of said housing from external moisture; a plurality of superposed plates within said space in said housing extending transverse of said stub shaft, alternate plates being secured only to said stub shaft for turning therewith and the remaining plates being secured only to said housing and all of said plates being movable longitudinally of the stub shaft into frictional engagement in said superposed relation; and spring means bearing against the closed end of the housing and resiliently urging said plates into frictional contact, said plates and spring means filling said fixed space in said housing so that said plates are urged together in constant amount for transmitting torque between the stub shaft and housing in amounts up to a predetermined maximum range variable within the range directly with tractor input drive shaft speed.

3. A tractor drive shaft torque transmitting device for transmitting torque up to a maximum range variable directly with input drive shaft speed comprising: a generally cylindrical closed housing having a longitudinal axis, said housing having a removable cover member adapted to be secured to the housing to seal the interior thereof from the exterior; a stub shaft idly carried by said housing and cover member coaxially of the housing; means on said housing and stub shaft for connection thereof to portions of said tractor drive shaft in position for transmission of torque by said shaft only through said device; a plurality of superposed plates in said housing having surfaces transverse said axis for frictional driving contact with each other, alternate plates having a central opening drivingly directly connected to said stub shaft and being free of contact with said housing, the remaining plates having outwardly extending ears and said housing having longitudinally extending slots receiving said ears for drivingly connecting said remaining plates with said housing, said remaining plates being free of connection with said stub shaft; spring means in said housing bearing against the housing and urging said plates longitudinally of said housing to bring the plates into face-to-face frictional contact, said cover member, when sealed to said housing, providing a space within the housing of predetermined longitudinal length, said space being filled by said spring and plates for providing a predetermined compression between said plates, said spring means providing said plates with generally uniform loading for transmission of torque therebetween in amounts no greater than a predetermined range of maximum torque directly proportional to speed of the tractor drive shaft.

References Cited in the file of this patent

UNITED STATES PATENTS

| | | |
|---|---|---|
| 2,389,772 | Gilbert | Nov. 27, 1945 |
| 2,747,713 | Light | May 29, 1956 |
| 2,872,794 | Slomer | Feb. 10, 1959 |